United States Patent
Bucher et al.

(10) Patent No.: US 12,250,893 B2
(45) Date of Patent: Mar. 18, 2025

(54) POWERTRAIN SYSTEM AND MANAGEMENT

(71) Applicant: AGTONOMY, South San Francisco, CA (US)

(72) Inventors: Timothy Bucher, Geyserville, CA (US); Steven Holmes, Redwood City, CA (US)

(73) Assignee: AGTONOMY, South San Francisco, CA (US)

( * ) Notice: Subject to any disclaimer, the term of this patent is extended or adjusted under 35 U.S.C. 154(b) by 225 days.

(21) Appl. No.: 17/807,090

(22) Filed: Jun. 15, 2022

(65) Prior Publication Data

US 2022/0394914 A1 Dec. 15, 2022

Related U.S. Application Data

(60) Provisional application No. 63/210,592, filed on Jun. 15, 2021.

(51) Int. Cl.
*A01B 63/112* (2006.01)
*A01B 63/08* (2006.01)

(52) U.S. Cl.
CPC ............ *A01B 63/112* (2013.01); *A01B 63/08* (2013.01)

(58) Field of Classification Search
CPC ....... A01B 63/112; A01B 63/08; A01B 67/00; B60W 2300/15; B60W 2420/403; B60W 2556/10; B60W 30/182
See application file for complete search history.

(56) References Cited

U.S. PATENT DOCUMENTS

| | | | | |
|---|---|---|---|---|
| 2006/0020383 | A1* | 1/2006 | Betz | B60K 6/46 701/50 |
| 2015/0176705 | A1* | 6/2015 | Dix | F16H 61/431 701/50 |
| 2015/0292608 | A1* | 10/2015 | McKinzie | B60K 6/547 74/661 |
| 2016/0001655 | A1* | 1/2016 | Matsuzaki | B60K 23/08 701/60 |
| 2018/0043764 | A1* | 2/2018 | McKinzie | B60K 6/44 |
| 2019/0104675 | A1* | 4/2019 | Shinkai | A01B 79/005 |
| 2019/0351910 | A1* | 11/2019 | Kassen | B60W 10/12 |
| 2020/0063401 | A1* | 2/2020 | Sherlock | G05D 1/0219 |
| 2020/0070906 | A1* | 3/2020 | Laperle | B60T 8/1725 |
| 2021/0000006 | A1* | 1/2021 | Ellaboudy | A01B 69/008 |
| 2021/0051838 | A1* | 2/2021 | Disberger | A01B 59/048 |
| 2021/0173399 | A1* | 6/2021 | Richard | B60W 30/146 |

(Continued)

*Primary Examiner* — Jason Holloway
*Assistant Examiner* — Madison B Emmett
(74) *Attorney, Agent, or Firm* — Maschoff Brennan

(57) ABSTRACT

An agricultural tractor may include a powertrain configured to drive one or more wheels of the agricultural tractor. In these and other embodiments, the powertrain may be configured to operate in multiple powertrain modes. The agricultural tractor may also include an image sensor configured to capture an image of an environment surrounding the agricultural tractor and a processing system. In some embodiments, the processing system may be configured to perform operations. In these and other embodiments, the operations may include determining an environmental condition surrounding the agricultural tractor based on the image and selecting one of the multiple powertrain modes based on the environmental condition.

20 Claims, 5 Drawing Sheets

(56) References Cited

U.S. PATENT DOCUMENTS

| | | | | |
|---|---|---|---|---|
| 2021/0323515 A1* | 10/2021 | Scheuerell | .............. | G01P 13/00 |
| 2022/0110262 A1* | 4/2022 | Vandike | ................. | B60K 35/00 |
| 2022/0132723 A1* | 5/2022 | Anderson | .............. | G01C 21/20 |
| | | | | 701/25 |
| 2022/0304215 A1* | 9/2022 | Shirafuji | .............. | G05D 1/0278 |

* cited by examiner

POWERTRAIN SYSTEM AND MANAGEMENT

CROSS-REFERENCE TO RELATED APPLICATION

This application claims priority to U.S. Provisional Patent Application No. 63/210,592 filed Jun. 15, 2021, the disclosure of which is hereby incorporated herein by this reference in its entirety.

FIELD

The present disclosure is generally directed towards a powertrain system and management.

BACKGROUND

Farming and agricultural ventures are often associated with labor intensive work and long hours. In some circumstances, long hours may be attributed to the large tracts of land and numerous crops that may be included in an operation. Tractors are often used to help reduce the amount of time and effort needed to further the farming and agricultural ventures.

The subject matter claimed in the present disclosure is not limited to embodiments that solve any disadvantages or that operate only in environments such as those described above. Rather, this background is only provided to illustrate one example technology area where some embodiments described in the present disclosure may be practiced. Furthermore, unless otherwise indicated herein, the materials described herein are not prior art to the claims in the present application and are not admitted to be prior art by inclusion in this section.

BRIEF SUMMARY

In an embodiment, an agricultural tractor may include a powertrain configured to drive one or more wheels of the agricultural tractor. In these and other embodiments, the powertrain may be configured to operate in multiple powertrain modes. The agricultural tractor may also include an image sensor configured to capture an image of an environment surrounding the agricultural tractor and a processing system. In some embodiments, the processing system may be configured to perform operations. In these and other embodiments, the operations may include determining an environmental condition surrounding the agricultural tractor based on the image and selecting one of the multiple powertrain modes based on the environmental condition.

These and other aspects, features and advantages may become more fully apparent from the following brief description of the drawings, the drawings, the detailed description, and appended claims.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
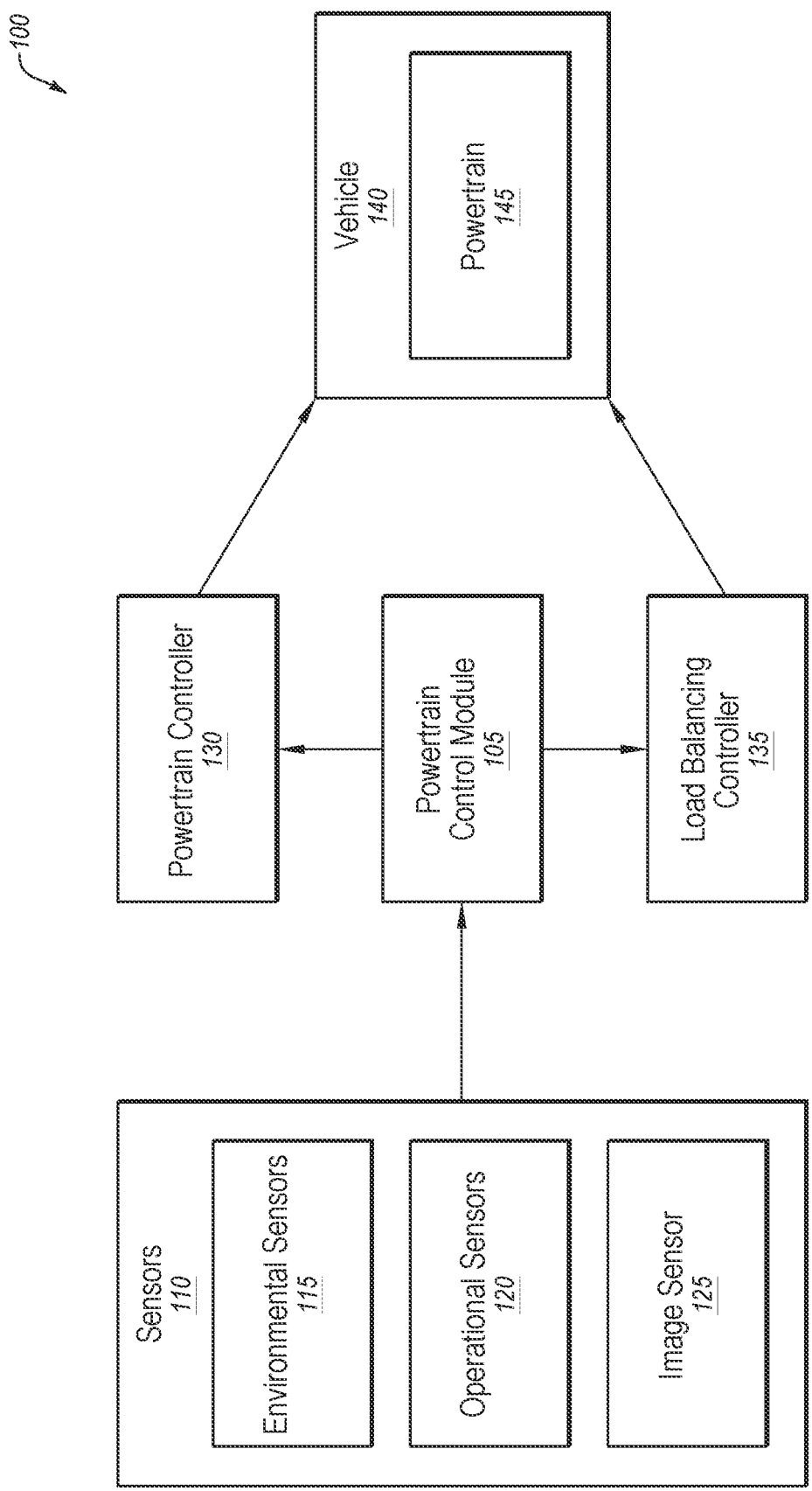
FIG. 1 is a block diagram of an example environment to control a powertrain of a vehicle.

Tractors and other large equipment are used in large agricultural undertakings to help operators reduce the amount of time and energy required to manage large parcels of land. Tractors are often limited to a single option for a powertrain, usually either two-wheel drive or four-wheel drive. In either powertrain option, power is equally delivered to the operable axle without regard to traction needs.

Tractors lacking in traction control may spin wheels or otherwise struggle with traction in certain circumstances. In such circumstances, spinning and/or sliding wheels may cause damage to the soil and terrain, including soil compaction, erosion, and damage to plants. Further, tractors may not be capable of adjusting the amount of power delivered to axles and/or wheels to enable the tractor to be better suited in various operating environments.

In some embodiments, a tractor may include a variable powertrain that may be capable of adjustment without operator input. For example, the powertrain control system may obtain sensor data that may provide information about an environment in which the tractor is operating. In these or other embodiments, the powertrain control system may adjust the tractor's powertrain based on the obtained sensor data. The adjustment may improve the tractor's performance in the environment. Further, the powertrain control system may use iterations of sensor data to determine different powertrain settings for the tractor's use in various environments and may cause adjustment of the powertrain settings to a particular state prior to entering a particular environment that corresponds to the particular state.

In some embodiments of the present disclosure, the powertrain control system may include traction sensing, traction control, and automatic transitions between powertrain modes. In some embodiments, a tractor that automatically switches powertrain modes may reduce the amount of soil and terrain damage by limiting the amount of spinning and/or sliding. Further, automatic transitioning may provide power to the axles and/or wheels in such circumstances that may improve traction and/or stability of the tractor. In some embodiments, a variable powertrain tractor may also reduce energy consumption by limiting the amount of power used by the powertrain when environmental conditions may not warrant additional power.

In the present disclosure, the term "tractor" may refer to an agricultural tractor and/or other power equipment or vehicles that may be used in an agricultural setting. Alternatively or additionally, the term "tractor" may include a power vehicle that may be configured to support and operate an implement, which may be used in the agricultural setting or any other applicable setting. Further, while discussed in primarily an agricultural setting, some embodiments of the present disclosure may be used in other settings, such as mining, construction, and/or other locales where large machinery may be beneficial. Additionally, the examples of the present disclosure may refer to a tractor including two axles and/or four wheels. However, the number of axles and/or wheels may be greater while still implementing the embodiments of the present disclosure. Alternately or additionally, the tractor (i.e. vehicle) described in this disclosure may be autonomous, semi-autonomous, remote controlled, or manually controlled tractor.

FIG. 1 is a block diagram of an example environment 100 to control a powertrain of a vehicle, in accordance with at least one embodiment described in the present disclosure. The environment 100 may include a powertrain control module 105, sensors 110, a powertrain controller 130, load balancing controller 135, and a vehicle 140.

In some embodiments, the sensors 110 may include environmental sensors 115, operational sensors, and image sensors 125. In some embodiments, the environmental sensors 115 may be configured to detect an operating environment of the vehicle 140. For example, the environmental sensors 115 may be configured to detect current terrain conditions including a slope amount such as from hills or depressions, driving surface conditions including accumulated precipitation and soil conditions such as an amount of soil compaction, a moisture level, and/or other soil factors. Alternatively or additionally, the environmental sensors 115 may be configured to detect upcoming terrain conditions including a slope amount such as from hills or depressions, driving surface conditions including accumulated precipitation and soil conditions such as an amount of soil compaction, a moisture level, and/or other soil factors. In these and other embodiments, the powertrain control module 105 may be configured to obtain data produced by the environmental sensors 115.

As examples, the environmental sensors 115 may include a soil moisture sensor to monitor the soil moisture, a strain gauge sensor attached to a blade in the soil to measure soil compaction, a transmitting optical sensor configured to transmit light that reflects off of soil and a receiving optical sensor configured to receive a reflection of the transmitted light from the soil to determine soil conditions based on the reflected light, a electromagnetic sensor that measure the capability of soil particles to conduct electricity to determine soil moisture levels and compaction, lidar and/or sonar sensors to determine a slope, depressions, and other driving surface conditions, and/or image sensors to determine a slope, depressions, and other driving surface conditions, among other sensors.

In these or other embodiments, the sensors 110 may include operational sensors 120. The operational sensors 120 may be configured to detect the handling and response of the vehicle 140 to the operating environment. For example, the operational sensors 120 may be configured to detect slipping in the wheels of the tractor, the weight distribution of the vehicle 140 including the amount of force exerted through each axle end and/or wheel, load distribution and usage characteristics associated with an attached implement, and/or other tractor conditions. In some embodiments, the operational sensors 120 may be configured to determine one or more characteristics associated with the attached implement, which characteristics may contribute to the dynamics, stability, and/or operation of the vehicle 140 in the environment 100. In these and other embodiments, the powertrain control module 105 may be configured to obtain data produced by the operational sensors 120.

As examples, the operational sensors 120 may include a force sensor, a torque sensor, a temperature sensor, a counter that determines revolutions per minute of an engine, axel, or other moving element in the vehicle 140, an airflow sensor, an oxygen sensor, a pressure sensor, among other sensors. Alternately or additionally, the operational sensors 120 may include image sensors, lidar sensors, radar sensors, accelerometers, gyroscopes, global positioning system sensors, mesh network sensors to determine a location of a vehicle, penetrometers, wheel speed sensors, and/or other sensors configured to detect an operating environment and/or a vehicle's response to the operating environment. For example, the operational sensors 120 and/or the environmental sensors 115 may detect the current grade, the future grade, positional data, soil consistency and/or hardness, wheel speed, tractor weight distribution, and/or other operating environment variables.

In some embodiments, the environmental sensors 115 used in detecting the operating environment and the one or more operational sensors 120 used in detecting the handling and response of the vehicle 140 to the operating environment may include the same or substantially the same sensors.

In some embodiments, the image sensors 125 may be configured to obtain an image of the vehicle 140 and/or an environment surrounding the vehicle 140. The image may be a single image, multiple images, or a series of images at particular intervals, such as to produce video. In these and other embodiments, the powertrain control module 105 may be configured to obtain images generated by the image sensors 125.

The vehicle 140 may be a tractor, such as an agriculture tractor or any other type of tractor or machine used industry. Alternately or additionally, the vehicle 140 may be any other type of vehicle, such as a vehicle used for recreation or other type of vehicle. In these and other embodiments, the vehicle 140 may be autonomous, semi-autonomous, remote controlled, or manually controlled. Alternately or additionally, the vehicle 140 may include an internal combustion engine. Alternatively or additionally, the vehicle 140 may include one or more electrical motors that use electricity provided by one or more batteries. Alternatively or additionally, the vehicle 140 may include one or more other type of motors and/or engines.

The vehicle 140 may include a powertrain 145. The powertrain 145 may include any suitable system, device, or component that may operate as a powertrain of the vehicle 140 by converting power into movement by the vehicle 140. For example, the powertrain 145 may include one or more of: an engine, a transmission, an electric motor, a driveshaft, differentials, axles, wheels, etc. In some embodiments, the number of wheels of the vehicle 140 may vary based on the number of axles. In these and other embodiments, the number of wheels per axle may vary. For example, each axle may have two, four, six, eight, or some other number of wheels. In these and other embodiments, one axle of the vehicle 140 may have more wheels than another axle of the vehicle 140.

In some embodiments, the powertrain 145 may include two or more independently controlled axles. In some embodiments, a motor may be configured to provide power to one or more of the axles. For example, the vehicle 140 may be configured to deliver power to either a front axle or a rear axle in single-axel drive, or to both the front axle and the rear axle in a two-axel drive. Alternatively or additionally, the powertrain 145 of the vehicle 140 may include motors disposed at each axle end such that each wheel or set of wheels may be individually controlled.

In some embodiments, the powertrain 145 may be configurable such that the powertrain may operate in multiple powertrain modes. The powertrain modes may include one or more of the following powertrain elements: a number of axles driven by the powertrain, a number of wheels driven by the powertrain, an air pressure of the one or more wheels, a wheel-base length for each axle of the powertrain, a wheel-base length for each driven axle of the powertrain, a weight distribution for each of the one or more wheels and/or axles, and a stiffness of one or more suspensions for each of the one or more wheels and/or axles, among others. The powertrain modes of the powertrain 145 may be variable, i.e. change, based on a command received from the powertrain controller 130. The powertrain controller 130 may be configured to receive commands from the powertrain control module 105 to adjust a powertrain mode of the powertrain 145. A powertrain mode may be combination of one or more of the powertrain elements. Thus, in some embodiments, a change in a powertrain mode may include a change to only one of the powertrain elements. For example, a change from a number of axels driven by the powertrain, for example from a single-axel drive to a dual-axel drive may be a change in a powertrain mode. As another example, a change from an air pressure of the one or more wheels may be a change in a powertrain mode. Alternately or additionally, a change in a powertrain mode may include a change to multiple of the powertrain elements.

In some embodiments, the powertrain mode may include the weight distribution for each of the one or more wheels and/or axels. In these and other embodiments, the powertrain control module 105 may be configured to load balance weight on the vehicle 140. In some embodiments, the load balancing controller 135 may be configured to interface with the powertrain control module 105 and/or the vehicle 140, such as one or more moveable weights on the vehicle 140. The powertrain control module 105 may be configured to command the load balancing controller 135 to redistribute the one or more weights which may contribute to better control of the vehicle 140 and less damage to the terrain in adverse operating conditions. For example, in instances where the rear wheels of the vehicle 140 are slipping, the powertrain control module 105 may direct the load balancing controller 135 to redistribute weight on the vehicle 140 toward the rear wheels. In some embodiments, the vehicle 140 may include one or more weights disposed on or in the vehicle 140 that may be controlled by the load balancing controller 135. For example, in instances in which the vehicle 140 is an electric vehicle, one or more of the batteries may be capable of moving forward, backward, to the left, to the right, and/or combinations thereof to contribute to load balancing as directed by the load balancing controller 135.

In some embodiments, the one or more weights controlled by the load balancing controller 135 may include motors that may be capable of moving the weights. For example, the one or more weights may be caused by the load balancing controller 135 to be adjusted by an electronic system of the vehicle 140. In some embodiments, the vehicle 140 may include adjustable spring mechanisms that may allow for different stiffness of one or more suspensions of the vehicle 140 in different powertrain modes.

The powertrain control module 105 may be configured to obtain data from the sensors 110 and determine an environmental condition surrounding the vehicle 140. The powertrain control module 105 may be further configured to select one of the powertrain modes based on the environmental condition. For example, in response to the determined environmental conditions (e.g., from environmental data from the environmental sensors 115) the powertrain control module 105 may select a powertrain mode to improve traction, reduce terrain damage, and/or otherwise improve the performance and handling of the vehicle 140 given the environmental condition. Alternately or additionally, the powertrain control module 105 may be configured to obtain data from the sensors 110 and determine a current operating condition (e.g., from operational data from the operation sensors 120). In response to the current operating condition, the powertrain control module 105 may select a powertrain mode. Alternatively or additionally, the powertrain control module 105 may be configured to obtain data from the sensors 110 and determine an environmental condition and a current operating condition. In response to the current operating condition and the environmental condition, the powertrain control module 105 may select a powertrain mode.

In some embodiments, the powertrain control module 105 may include code and routines configured to enable a computing system to perform one or more operations as described in this disclosure. Additionally or alternatively, the powertrain control module 105 may be implemented using hardware including a processor, a microprocessor (e.g., to perform or control performance of one or more operations), a field-programmable gate array (FPGA), or an application-specific integrated circuit (ASIC). In some other instances, the powertrain control module 105 may be implemented using a combination of hardware and software. In the present disclosure, operations described as being performed by the powertrain control module 105 may include operations that the powertrain control module 105 may direct a corresponding system to perform. Further, although described separately in the present disclosure to ease explanation of different operations performed and roles, in some embodiments, one or more portions of the powertrain control module 105 may be combined or part of the same module.

In some embodiments, the powertrain controller 130 may be configured to interface with the powertrain control module 105 and/or the vehicle 140, including the powertrain 145 thereof. For example, the powertrain controller 130 may be configured to receive input from the powertrain control module 105 that may be used by the powertrain controller 130 to direct operations and/or transitions between different powertrain modes of the powertrain 145. Additionally or alternatively, the powertrain control module 105 may be integrated with the powertrain controller 130.

In some embodiments, the powertrain controller 130 may include one or more motors, actuators, and/or other mechanical devices configured to operate the powertrain 145. For example, in instances in which the powertrain 145 is in a single-axel drive and the powertrain control module 105 determines the powertrain should transition to a dual-axel drive, the powertrain controller 130 may cause an actuator of the vehicle 140 to transition the powertrain 145 from to the dual-axel drive.

In some embodiments, the load balancing controller 135 may be configured to interface with the powertrain control module 105 and/or the vehicle 140, including the powertrain 145 thereof. The load balancing controller 135 may be configured to adjust the one or more moveable weights on the vehicle 140 to improve the stability of the vehicle 140. In some embodiments, the powertrain control module 105 may obtain operational data from the operational sensors 120 to determine instances in which load balancing for vehicle 140 stability may be implemented. For example, in instances in which the operational sensors 120 determine the vehicle 140 is approaching a tipping point (e.g., driving on a steep incline), the powertrain control module 105 may direct the load balancing controller 135 to cause one or more weights on the vehicle 140 to move which may adjust the center of mass of the vehicle 140 such that the vehicle 140 is more stable and/or less likely to tip over. In some embodiments, the powertrain control module 105 may be configured to cause the load balancing controller 135 to proactively readjust the one or more weights on the vehicle 140 once a threshold stability metric has been exceeded.

In some embodiments, the one or more weights may be configured to move to help improve traction of the vehicle 140 as needed. For example, in instances in which a vehicle 140 is driving across the slope of a grade, the powertrain control module 105 may direct the load balancing controller 135 to cause the one or more weights to be adjusted to the uphill side of the vehicle 140, which may improve traction. In another example, in instances in which a vehicle 140 is driving through soft soil and where the rear wheels are slipping, the powertrain control module 105 may direct the load balancing controller 135 to cause the one or more weights to be adjusted toward the rear of the vehicle 140, which may improve traction and may reduce damage to the soil. An adjustment of weight may be an example of a change in a powertrain mode. Thus, each configuration of the weights may be an example of a different powertrain mode.

In some embodiments, the load balancing controller 135 may be configured to adjust a stiffness of suspension of the vehicle 140. Adjusting the stiffness of the suspension may contribute to better control of the vehicle 140 and may cause less damage to the terrain in adverse operating conditions. For example, in instances in which a vehicle 140 is driving across the slope of a grade, the powertrain control module 105 may direct the load balancing controller 135 to cause the adjustable spring mechanisms on the uphill side of the vehicle 140 to be loosened and the adjustable spring mechanisms on the downhill side of the vehicle 140 to be stiffened which may contribute to greater stability of the vehicle 140 and less damage to the terrain.

In some embodiments, the powertrain control module 105 may direct the load balancing controller 135 to cause the adjustable spring mechanisms to be adjusted by an electronic system of the vehicle 140. For example, the powertrain control module 105 may direct the load balancing controller 135 to cause the adjustable spring mechanisms to be stiffened or loosened as needed to improve traction and/or stability of the vehicle 140 which may help reduce damage to the soil. In some embodiments, the amount of adjustment directed by the powertrain control module 105 to the adjustable spring mechanisms may be determined based on data from the one or more sensors 110, such as the operational sensors 120. For example, in instances where the operational sensors 120 detect the vehicle 140 is on a steep incline, the powertrain control module 105 may direct the load balancing controller 135 to cause the adjustable spring mechanisms to be stiffened and/or loosened more than instances where the vehicle 140 is on a gradual incline. A change in the stiffness and/or looseness of the adjustable spring mechanisms may be a change in the powertrain mode of the vehicle 140.

In some embodiments, the powertrain control module 105 may be configured to receive operator input to direct the powertrain controller 130 to switch the powertrain 145 between different powertrain modes. Alternatively or additionally, the powertrain control module 105 may respond to current operating conditions based on input from the one or more sensors 110 (e.g., data from the environmental sensors 115, data from the operational sensors 120, and/or images from the image sensors 125) to command the powertrain controller 130 to automatically transition the powertrain 145 to a different powertrain mode. For example, in instances in which the powertrain control module 105 receives data from the one or more sensors 110 that indicate a wet and/or slippery driving surface, the powertrain control module 105 may provide an output to the powertrain controller 130 to automatically cause powertrain 145 to transition from a single-axel drive to a dual-axel drive to improve traction and/or control of the vehicle 140. Alternatively or additionally, the powertrain control module 105 may predictively command the powertrain controller 130 to transition the powertrain 145 between the various powertrain modes based on input from the one or more sensors 110 and/or based on learned scenarios which may have previously caused the powertrain control module 105 to transition the powertrain 145 between powertrain modes. For example, in instances in which the one or more sensors 110, such as the image sensors 125, lidar, or radar, detect an upcoming grade, the powertrain control module 105 may automatically direct the powertrain controller 130 to transition the powertrain 145 from single-axel drive to a dual-axel drive in anticipation of decreased traction.

Alternatively or additionally, as described previously, the powertrain 145 of the vehicle 140 may include motors disposed at each axle end such that each wheel or set of wheels may be individually controlled. For example, in instances in which the powertrain control module 105 detects the left, rear wheel slipping relative to the other wheels (e.g., based on data received from one or more of the sensors 110), the powertrain control module 105 may adjust the power delivered to the left, rear wheel which may limit wheel slipping and maintain substantially similar motion to the other wheels. In some embodiments, the powertrain control module 105 may determine that the vehicle 140 may benefit from different amounts of power being delivered to each wheel of the vehicle 140, such that the variable power delivered to each wheel may result in substantially similar motion in each of the four wheels of the vehicle 140.

In some embodiments, the powertrain control module 105 may be configured to receive input from an attached implement. In some embodiments, the implement inputs may be determined using the operational sensors 120. For example, the operational sensors 120 may determine an amount of resistance contributed by the attached implement to the vehicle 140, the load contributed by the attached implement to the vehicle 140, the distribution of the load relative to the vehicle 140, etc. In some embodiments, the implement inputs may be dynamic and vary in time. For example, a harrow used in a first field that includes loamy soil may contribute to a resistance to the vehicle 140 that may differ from a harrow used in a second field that includes clay-like soil. In another example, an attached and retracted mower may include a load and load distribution profile that may differ from an attached and extended mower. In some embodiments, the implement inputs may be static and/or associated with a particular implement. For example, a first mower may be larger than a second mower and the first mower may include a different load and load distribution profile than the second mower. In these and other embodiments, the powertrain control module 105 may adjust the output to the powertrain controller 130 to select a different powertrain mode for the powertrain 145 in response to the implement inputs which may improve the traction and/or performance of the vehicle 140. Alternatively or additionally, the powertrain 145 may include one or more motorized implements which may increase the number of drive wheels to a number greater than four.

In some embodiments, the powertrain control module 105 may be configured to store environmental and/or operational conditions (e.g., as detected by one or more of the sensors 110) to predict future operational responses for the vehicle 140, which may include the powertrain control module 105 commanding the powertrain controller 130 to transition the powertrain 145 of the vehicle 140.

For example, the powertrain control module 105 may be configured to store detected grade and surface conditions. Alternatively or additionally, the powertrain control module 105 may be configured to associate the detected grade and surface conditions with positional data. In some embodiments, the powertrain control module 105 may be configured to predict future operational responses of the powertrain control module 105, based on the stored detected grade and surface conditions and the positional data associated therewith For example, in instances in which the powertrain control module 105 determines the grade of a path may be more than a threshold grade at a first position (e.g., based on the stored grade and surface conditions associated with the first position), the powertrain control module 105 may direct the powertrain controller 130 to transition the powertrain 145 from a single-axel drive to a dual-axel drive shortly prior to or upon reaching the first position.

In another example, in instances in which the powertrain control module 105 determines the soil may be soft at a second position based on environmental data obtained from the environmental sensors 115 that is associated with the second position (such that the soft soil may be likely to cause slipping in the wheels of the vehicle 140), the powertrain control module 105 may direct the powertrain controller 130 to select a different powertrain mode. For example, the powertrain 145 may transition from a single-axel drive to a dual-axel drive prior to reaching the second position. Alternately or additionally, the powertrain 145 from transition from a first tire pressure to a second tire pressure.

In another example, in instances in which the powertrain control module 105 determines a grade of a hill is greater than a threshold when traversing across the hill based on environmental data obtained from the environmental sensors 115 that is associated with the second position, the powertrain control module 105 may direct the powertrain controller 130 to select a different powertrain mode. For example, the powertrain 145 may transition from a first axel base width to a second axel base width. Alternately or additionally, the powertrain 145 may transition from first stiffness of the one or more suspensions to a second stiffness. Alternately or additionally, the powertrain 145 from transition from a first weight distribution for each of the one or more wheels to a second weight distribution for each of the one or more wheels.

In some embodiments, the powertrain control module 105 may direct the powertrain controller 130 to transition the powertrain 145 between powertrain modes in instances when adverse operating conditions are present. Adverse operating conditions may include soft soil and other soft terrain, a grade of 5% or greater, precipitation and other potentially slippery surfaces, obstacles including tall vegetation, dense vegetation, and/or steps, and/or other conditions where the vehicle 140 traction may be diminished or otherwise affected.

In some embodiments, the powertrain control module 105 may direct the powertrain controller 130 to transition the powertrain 145 from a first powertrain mode to a second powertrain mode when adverse operating conditions are not present, which may reduce the amount of resources used by the vehicle 140. For example, in instances in which the powertrain control module 105 determines that the vehicle 140 has moved from soft soil to a more compact driving surface (e.g., based on received input from one or more of the sensors 110), the powertrain control module 105 may direct the powertrain controller 130 to transition the powertrain 145 from a two-axel drive to a single-axel drive. In another example, in instances in which the powertrain control module 105 determines the vehicle 140 has moved from a surface with a grade greater than 5% to a substantially horizontal surface, the powertrain control module 105 may direct the powertrain controller 130 to transition the powertrain 145 from a two-axel drive to a single-axel drive.

In some embodiments, the powertrain control module 105 may yield to operator input. For example, in instances in which the powertrain control module 105 determines that the powertrain 145 should be a first powertrain mode but the operator manually selects a second powertrain mode, the powertrain control module 105 may not attempt to change the powertrain 145 from the second powertrain mode. The powertrain control module 105 may not attempt to automatically adjust the powertrain 145 until the operator provides an input to reenable the powertrain control module 105 and/or after a period of time has elapsed. For example, after the operator has overridden the powertrain control module 105, the powertrain control module 105 may not attempt to adjust the powertrain mode of the powertrain 145 for one hour.

In some embodiments, the powertrain control module 105 may include software and/or hardware components capable of implementing artificial intelligence (AI) and/or machine learning. Alternatively or additionally, the powertrain control module 105 may transmit sensor data from the one or more sensors 110 to the vehicle 140 and/or a remote system which vehicle 140 and/or remote system may include the software and/or hardware components capable of implementing the AI and/or machine learning, which may be trained to determine which powertrain mode may work better than others based on certain conditions indicated by sensor input.

In some embodiments, the AI and/or machine learning may aggregate operator responses relative to the vehicle 140 and may relate the aggregated responses to detected operating environments and may make determinations about operations of the vehicle 140 therefrom. For example, the AI and/or machine learning may associate the operator switching the powertrain 145 from a first powertrain mode to a second powertrain mode at a first location on multiple occasions and may direct the powertrain controller 130 to automatically switch the powertrain 145 from the first powertrain mode to the second powertrain mode in instances in which the vehicle 140 nears the first location in the future.

In some embodiments, the AI and/or machine learning system may be integrated with the powertrain control module 105, such that the powertrain control module 105 may perform some or all of the functions of the AI and/or machine learning system. Alternatively or additionally, the AI and/or machine learning may be separate and/or distinct from the powertrain control module 105 and may be configured to communicate with the powertrain control module 105. For example, in instances in which the AI and/or machine learning is separate from the powertrain control module 105, the operation of the AI and/or machine learning of the powertrain control module 105 may be performed by a computing system, such as the computing system 502 of FIG. 5.

In some embodiments, the powertrain control module 105 may be attached to an existing agricultural vehicle, such as a tractor. Alternative or additionally, the powertrain control module 105 may be incorporated with a future agricultural vehicle, such as an autonomous land drone.

Modifications, additions, or omissions may be made to the environment 100 without departing from the scope of the present disclosure. For example, the powertrain control module 105 and the sensors 110 may be integrated into the vehicle 140. Alternately or additionally, one or more of the sensors 110 and/or the powertrain control module 105 may not be integrated into the vehicle 140. For example, the powertrain control module 105 may be in a computing environment and provide instructions to the powertrain 145 of the vehicle 140. In these and other embodiments, the powertrain controller 130 may be part of the vehicle 140. As another example, one or more of the sensors, such as one or more of the environmental sensors 115 and/or the image sensors 125 may not be integrated into the vehicle 140. As another example, the load balancing controller 135 may be implemented in the powertrain controller 130 and not be a separate controller.

Figure 2:
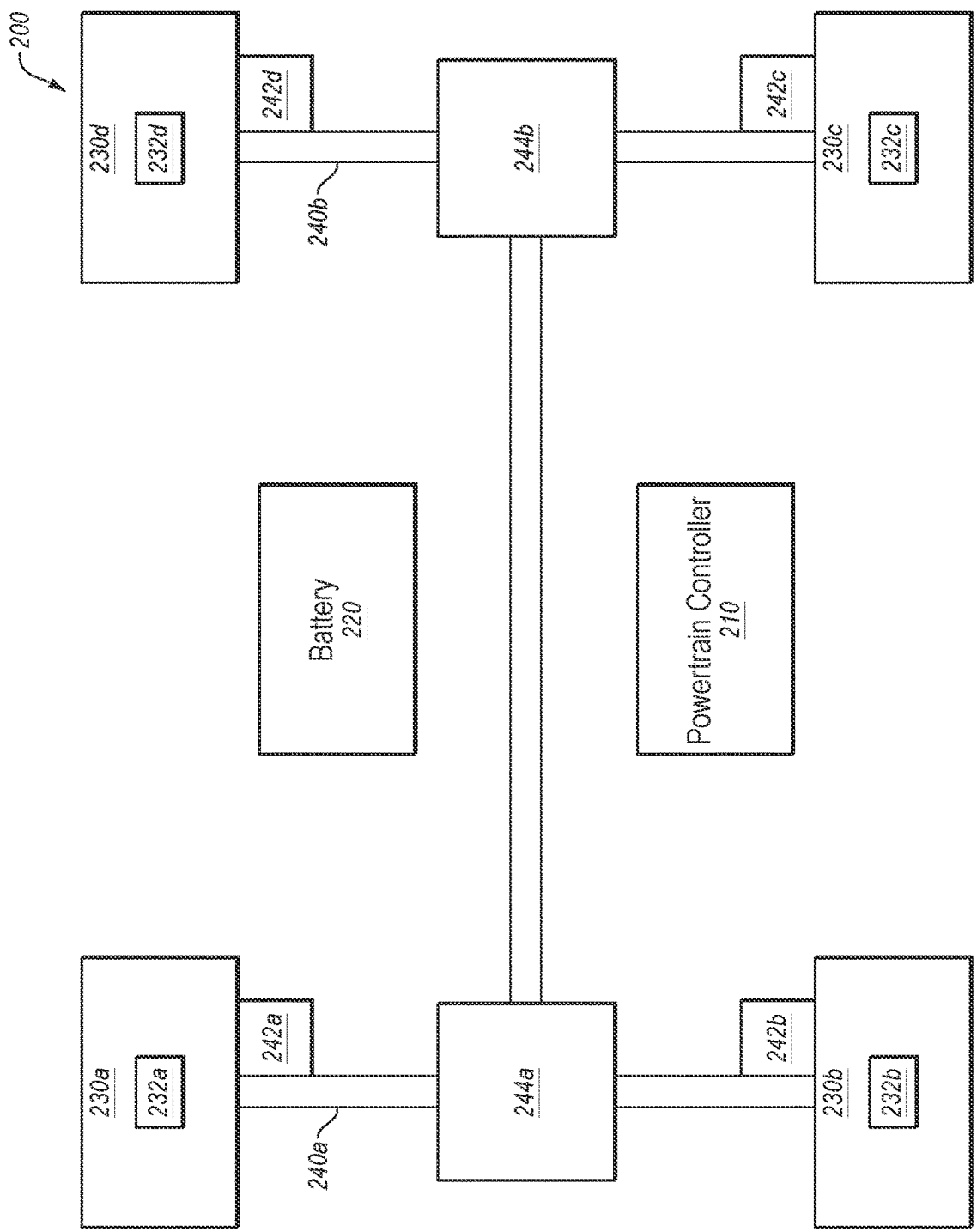
FIG. 2 illustrates an example vehicle.

FIG. 2 illustrates an example vehicle 200. The vehicle 200 may be arranged in accordance with at least one embodiment described in the present disclosure. The vehicle 200 may include a powertrain controller 210, a battery 220, a first wheel 230a, a second wheel 230b, a third wheel 230c, a fourth wheel 230d, collectively referred to as the wheels 230, a first pressure adjusting unit 232a, a second pressure adjusting unit 232b, a third pressure adjusting unit 232c, a fourth pressure adjusting unit 232d, collectively referred to as the pressure adjusting units 232, a first axel 240a, a second axel 240b, collectively referred to as axels 240, a first adjustable suspension 242a, a second adjustable suspension 242b, a third adjustable suspension 242c, a fourth adjustable suspension 242d, collectively referred to as the adjustable suspensions 242, a first axel/weight adjustment unit 244a, and a second axel/weight adjustment unit 244b, collectively referred to as axel/weight adjustment units 244.

In some embodiments, the powertrain controller 210 may be analogous to the powertrain control module 105, the load balancing controller 135, and/or the powertrain controller 130 of FIG. 1. In these and other embodiments, the powertrain controller 210 may be configured to control the elements of the vehicle 200 illustrated in FIG. 2 as described with respect to FIG. 1. The battery 220 may provide power for the powertrain controller 210 and the elements illustrated in FIG. 2.

In some embodiments, the first wheel 230a and the second wheel 230b may be coupled to the first axel 240a. The third wheel 230c and the fourth wheel 230d may be coupled to the second axel 240b. The pressure adjusting units 232 may be configured to adjust the air pressure of the wheels 230. For example, the pressure adjusting units 232 may include a controllable valve that is able to open to reduce air pressure in the wheels 230. The pressure adjusting units 232 may further include an air pump to increase the air pressure in the wheels 230.

In some embodiments, the adjustable suspensions 242 may be located next to each of the wheels 230 and may be configured to adjust a stiffness of the suspension for each of the wheels 230. For example, the adjustable suspensions 242 may include a hydraulic element, such as a piston. The pressure of the hydraulic element may be adjusted to adjust the stiffness of the suspension.

In some embodiments, the axel/weight adjustment units 244 may be configured to drive the axels 240. For example, the first axel/weight adjustment unit 244a may individually drive the first axel 240a and the second axel/weight adjustment unit 244b may individually drive the second axel 240b such that either one or both of the axels 240 may be driven.

In some embodiments, the axel/weight adjustment units 244 may be further configured to adjust a length of each of the axels 240 to adjust a width of a base of the vehicle 200.

For example, portions of the axels 240 within the axel/weight adjustment units 244 may be extended to adjust a length of the axels 240.

In some embodiments, the axel/weight adjustment units 244 may be further configured to adjust a weight distribution of the vehicle 200. For example, the axel/weight adjustment units 244 may include a motor to move one or more weights within the axel/weight adjustment units 244 to adjust a weight distribution of the vehicle 200.

Modifications, additions, or omissions may be made to the vehicle 200 without departing from the scope of the present disclosure. For example, the vehicle 200 may include more wheels than the four illustrated wheels. As another example, the vehicle 200 may include one or more batteries 220. In these and other embodiments, another motor or actuator that may be configured to move the location of batteries to adjust a weight distribution of the vehicle 200.

Figure 3:
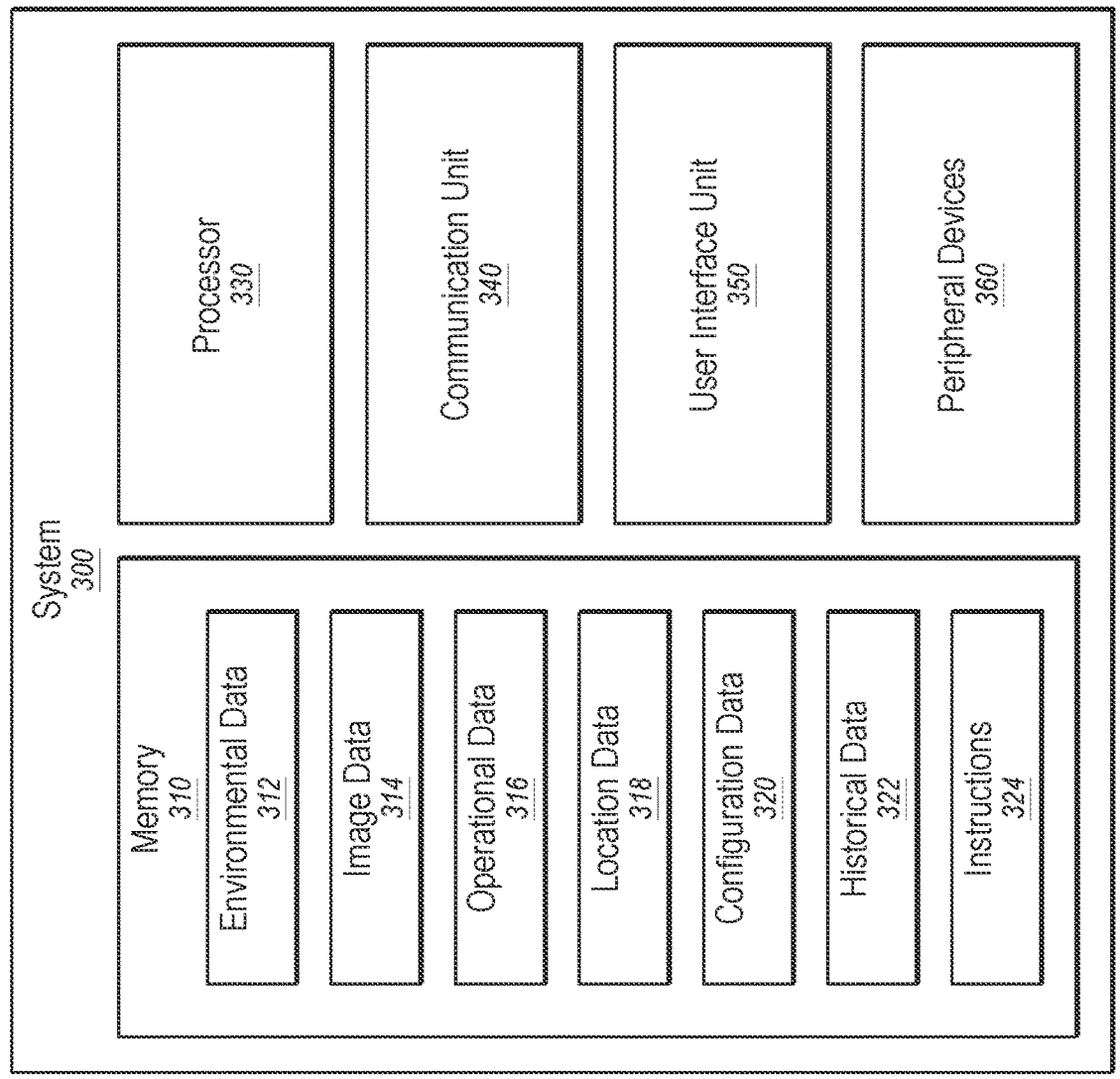
FIG. 3 illustrates an example system to control a vehicle.

FIG. 3 illustrates an example system 300 to control a vehicle. The system 300 may be arranged in accordance with at least one embodiment described in the present disclosure. The system 300 may be part of a vehicle such as part of the vehicle 140 of FIG. 1. The system 300 may include a memory 310, a processor 330, a communication unit 340, a user interface unit 350, and peripheral devices 360. The memory 310 and the processor 330 may be configured analogous to the memory 552 and processor 550 of FIG. 5.

In some embodiments, the memory 310 may include data including, environmental data 312, image data 314, operational data 316, location data 318, configuration data 320, and historical data 322. The memory 310 may further include powertrain mode selection instructions 324 that may be executed by the processor 330 to cause a vehicle to perform operations based on the data. For example, the processor 330 may execute the powertrain mode selection instructions 324 to cause a vehicle to perform operations with respect to selecting and implementing powertrain modes as described with respect to FIG. 1.

In some embodiments, the environmental data 312 may include data obtained from environmental sensors, such as environmental sensors 115 of FIG. 1. Alternately or additionally, the environmental data 312 may be obtained from database, data storage, third-party applications, application programming interface (API), etc. For example, environmental data, such as an amount of precipitation, wind, temperature, etc. may be obtained from a third-party website or API.

In some embodiments, the image data 314 may be obtained from an image sensor. The image sensor may be part of the vehicle or separate from the vehicle, such as part of a stationary camera, such as a webcam.

In some embodiments, the operational data 316 may be obtained from operational sensors, such as the operation sensors 120 of FIG. 1. For example, the operational data 316 may include data from sensors regarding the operation of the agricultural tractor and/or data regarding implements attached to the agricultural tractor. Alternately or additionally, the operational data 316 may include one or more selected operational parameters for the vehicle. The operational parameter may be selected by a user of the vehicle or associated with the vehicle. The operational parameters may include fuel consumption of the vehicle, operational speed, such as moving speed or speed of an operation being performed by an implement attached to the vehicle, e.g., tilling, mowing, harvesting, spreading, spraying, etc., soil disruption, and soil compaction. In these and other embodiments, a powertrain mode may be selected based on the environmental condition and the operational parameter. For example, a powertrain mode may be selected based on the environmental condition and that prioritizes performance of the selected operational parameter.

As an example, for a first environmental condition a first powertrain mode may be selected. However, for the first environmental condition and with the operational parameter of fuel consumption selected, a threshold that is used to select the first powertrain may be adjusted based on the operational parameter such that a second powertrain mode may be selected. For example, a powertrain mode that includes two-axel drive may be selected when a grade of a path is above a threshold of 4%. However, if the operational parameter of fuel consumption is selected, the threshold may be increased to 5% for the powertrain mode that includes two-axel drive to be selected.

The location data 318 may include a location of the vehicle as determined by the vehicle, such as by a GPS sensor, or as provided to the vehicle from another system. Alternately or additionally, the location data 318 may include maps of the location of the vehicle, such as grade of slopes.

In some embodiments, the configuration data 320 may include possible powertrain modes variables. For example, the configuration data 320 may include maximum and minimum wheel air pressure, maximum and minimum axel lengths, maximum and minimum suspension stiffness, potential weight distribution combinations, axel drive combinations, among other information regarding the powertrain modes which may be selected based on the powertrain mode selection instructions 324.

Alternately or additionally, the configuration data 320 may include a listing of potential powertrain modes which may be selected. In some embodiments, the powertrain modes may include one or more of the following powertrain elements: a number of axels driven by the powertrain, a number of wheels driven by the powertrain, an air pressure of the one or more wheels, a wheel-base length for each axle of the powertrain, a wheel-base length for each driven axle of the powertrain, a weight distribution for each of the one or more wheels and/or axels, and a stiffness of one or more suspensions for each of the one or more wheels and/or axels, among others. For example, some powertrain modes may include a setting for one of the elements. For these powertrain modes, the settings for the other powertrain elements if available to be changed, may remain the same. As another example, some powertrain modes may include a setting for multiple of the elements. For these powertrain modes, the settings for the powertrain elements included may be changed and the other settings, if available to be changed, may remain the same.

In some embodiments, the historical data 322 may include an indication of a selection of a powertrain mode and the data upon which the selection was based. For example, the historical data 322 may indicate that a first powertrain mode was selected on a specific date given a specific location and weather pattern near and on that date, e.g. rainfall on or before that date.

In some embodiments, the powertrain mode selection instructions 324 may cause the processor 330 to use the data from the memory 310 to select a powertrain mode based on the configuration data 320. The processor 330 may send an instruction to another device in the vehicle that includes the example system 300 to cause the selected powertrain mode to be implemented.

In some embodiments, the instructions may include rules for the selection of the powertrain mode selection. For example, when the data is within certain thresholds, particular settings for each of the powertrain elements are selected to form a selected powertrain mode. In these and other embodiments, selection of the conditional parameters may adjust the thresholds for the rules.

Alternately or additionally, the powertrain mode selection instructions 324 may include machine learning models that select powertrain modes based on the data. Alternately or additionally, the powertrain mode selection instructions 324 may include look-up tables that may be used to select the powertrain mode. In these and other embodiments, the look-up tables and/or rules may be updated based on previous use of a powertrain mode selected for similar data, such as a same location, terrain type, environmental factors, etc. For example, the powertrain mode selection instructions 324 may adjust values for the look-up table and/or rules based on a response of a user of the vehicle. For example, a first powertrain mode may be selected based on the data. In response to the first powertrain mode, the user may select a second powertrain mode. In these and other embodiments, the look-up table and/or rules may be adjusted so that the second powertrain mode is selected for the data. Alternately or additionally, a combination of rules, look-up tables, and machine learning models may be used.

Some example implementations are now discussed regarding how a powertrain mode may be selected based on the data.

In some embodiments, an image from the image data 314 may be analyzed to determine an environmental condition surrounding a vehicle. Based on the environmental condition, a particular powertrain mode may be selected and implemented. For example, based on the image, mud or slick areas may be detected. Based on the mud, a powertrain mode may be selected that drives more axels than in a previous powertrain mode.

In some embodiments, the operational data 316 and/or environmental data 312 may be obtained. In these and other embodiments, based the operational data 316 and/or the environmental data 312, a particular powertrain mode may be selected and implemented.

In some embodiments, an image from the image data 314, the operational data 316, and/or the environmental data 312 may be obtained. In these and other embodiments, based on the image, the operational data 316, and/or the environmental data 312, a particular powertrain mode may be selected and implemented.

In some embodiments, the location data 318, an image from the image data 314, the operational data 316, the configuration data 320, the historical data 322 and/or the environmental data 312 may be obtained. In these and other embodiments, based the data, a particular powertrain mode may be selected and implemented. Other configurations of the data may be used to select a particular powertrain mode.

In some embodiments, some data may not be available, such as the environmental data 312, the image data 314, and/or the operational data 316. Alternately or additionally, information from the data may not be able to be derived. For example, an image may be available but be of a low quality such that environmental conditions surrounding the vehicle may not be able to be determined from the image. In these and other embodiments, data from the historical data 322, such as data for the location from a different day similar to the current day may be used to select the powertrain mode. A similar day may be a day from the same season and a day within a certain number of days of rainfall, irrigation, etc. Alternately or additionally, a powertrain mode selected for the location from the historical data 322 for a day similar to the current day may be selected without applying the data to the rules, look-up table, and/or machine learning model of the powertrain mode selection instructions 324.

The communication unit 340 may include any component, device, system, or combination thereof that is configured to transmit or receive information over a network. In some embodiments, the communication unit 340 may communicate with other devices at other locations, the same location, or even other components within the same system. For example, the communication unit 340 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 340 may permit data to be exchanged with a network and/or any other devices or systems described in the present disclosure. For example, the communication unit 340 may obtain some portion of the data stored in the memory 310.

The user interface unit 350 may include any device to allow a user to interface with the system 300. For example, the user interface unit 350 may include a mouse, a track pad, a keyboard, buttons, camera, and/or a touchscreen, among other devices. The user interface unit 350 may receive input from a user and provide the input to the processor 330. For example, the user interface unit 350 may allow a user to select a powertrain mode.

The peripheral devices 360 may include one or more devices. For example, the peripheral devices may include a microphone, display, an imager, and/or a speaker, among other peripheral devices. In these and other embodiments, the microphone may be configured to capture audio. The imager may be configured to capture images. The images may be captured in a manner to produce video or image data. The display may be configured to present data. In some embodiments, the speaker may broadcast audio received by the system 300 or otherwise generated by the system 300. The system 300 may include a speech recognizer configured to respond to verbal commands captured by the microphone. For example, the peripheral devices 360 may present an indication of the powertrain mode selection and/or the data that may be used to select the selected powertrain mode.

Modifications, additions, or omissions may be made to the system 300 without departing from the scope of the present disclosure. For example, the system 300 may include additional elements and/or data. Alternately or additionally, the system 300 may not include some of the elements and/or data illustrated in FIG. 3.

Figure 4:
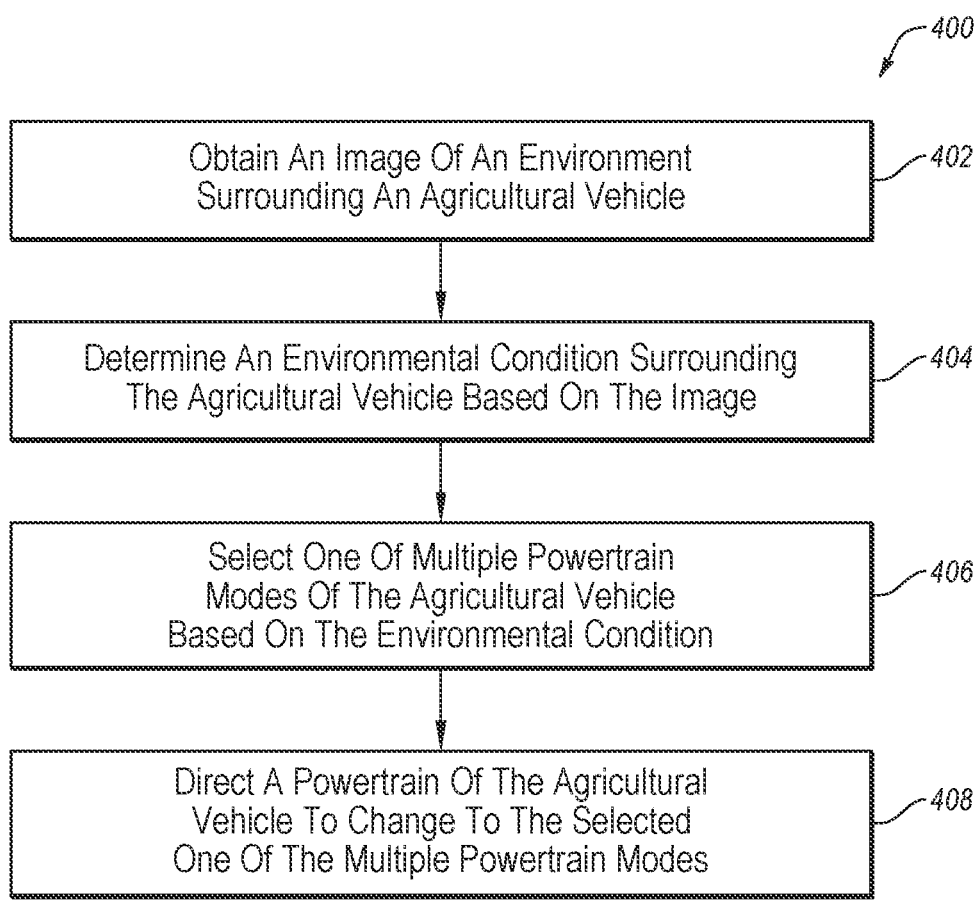
FIG. 4 illustrates a flowchart of an example method to control a tractor.

FIG. 4 illustrates a flowchart of an example method 400 to control a tractor. The method 400 may be arranged in accordance with at least one embodiment described in the present disclosure. One or more operations of the method 400 may be performed, in some embodiments, by a device or system, such as the powertrain control module 105 of FIG. 1, the system 300 of FIG. 3, or another device or combination of devices. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where an image of an environment surrounding an agricultural tractor may be obtained. At block 404, an environmental condition surrounding the agricultural tractor may be determined based on the image.

At block 406, one of multiple powertrain modes of the agricultural tractor may be selected based on the environmental condition. In some embodiments, the multiple powertrain modes may each include a configuration of one or more of: a number of one or more wheels driven by the powertrain, an air pressure of the one or more wheels, a wheel-base length for each axle of the powertrain, weight distribution for each of the one or more wheels, and a stiffness of one or more suspensions of the agricultural tractor, among other items.

At block 408, a powertrain of the agricultural tractor may be directed to change to the selected one of the multiple powertrain modes. In some embodiments, the environmental condition may be in a potential path of the agricultural tractor and the one of multiple powertrain modes may be selected before the agricultural tractor reaches the environmental condition. In these and other embodiments, the directing the powertrain of the agricultural tractor to change to the selected one of the multiple powertrain modes may occur before the agricultural tractor reaches the environmental condition.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 400 may further include obtaining a second image of a second environment surrounding the agricultural tractor and determining a second environmental condition surrounding the agricultural tractor is unable to be determined based on the second image. The method 400 may further include obtaining environmental data regarding the environment surrounding the agricultural tractor and in response to being unable to determine the second environmental condition based on the second image, selecting one of the multiple powertrain modes of the agricultural tractor based on the environmental data. In these and other embodiments, the environmental data may be historical environmental data.

As another example, the method 400 may further include obtaining operational data regarding operation of the agricultural tractor. In some embodiments, the selecting the one of the multiple powertrain modes may be based on the environmental condition and the operational data. In these and other embodiments, the operational data may include one or more of: data from sensors regarding the operation of the agricultural tractor, data regarding implements attached to the agricultural tractor, a selected operational parameter for the agricultural tractor, among other operational data.

Figure 5:
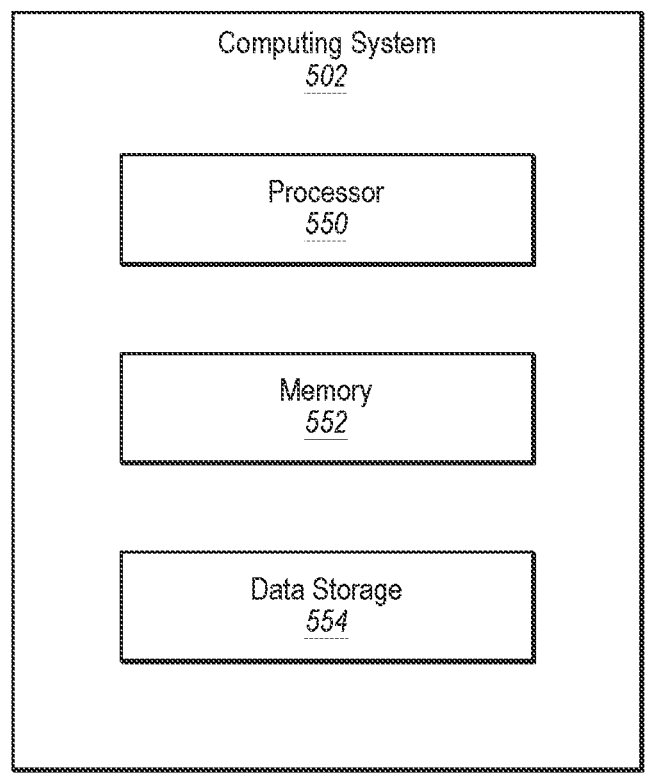
FIG. 5 illustrates a block diagram of an example computing system.

FIG. 5 illustrates a block diagram of an example computing system 502, according to at least one embodiment of the present disclosure. The computing system 502 may be configured to implement or direct one or more operations associated with a powertrain system (e.g., the powertrain control module 105 of FIG. 1). Additionally or alternatively, the computing system 502 may be included with a powertrain controller such as the powertrain controller 130 of FIG. 1. The computing system 502 may include a processor 550, a memory 552, and a data storage 554. The processor 550, the memory 552, and the data storage 554 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 550 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, the processor 550 may include any number of processors configured to, individually or collectively, perform or direct performance of any number of operations described in the present disclosure. Additionally, one or more of the processors may be present on one or more different electronic devices, such as different servers.

In some embodiments, the processor 550 may be configured to interpret and/or execute program instructions and/or process data stored in the memory 552, the data storage 554, or the memory 552 and the data storage 554. In some embodiments, the processor 550 may fetch program instructions from the data storage 554 and load the program instructions in the memory 552. After the program instructions are loaded into memory 552, the processor 550 may execute the program instructions.

For example, in some embodiments, the modification module may be included in the data storage 554 as program instructions. The processor 550 may fetch the program instructions of a corresponding module from the data storage 554 and may load the program instructions of the corresponding module in the memory 552. After the program instructions of the corresponding module are loaded into memory 552, the processor 550 may execute the program instructions such that the computing system may implement the operations associated with the corresponding module as directed by the instructions.

The memory 552 and the data storage 554 may include computer-readable storage media for carrying or having computer-executable instructions or data structures stored thereon. Such computer-readable storage media may include any available media that may be accessed by a general-purpose or special-purpose computer, such as the processor 550. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 550 to perform a certain operation or group of operations.

Modifications, additions, or omissions may be made to the computing system 502 without departing from the scope of the present disclosure. For example, in some embodiments, the computing system 502 may include any number of other components that may not be explicitly illustrated or described.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1 may include a method to control a tractor. method to control a tractor. The method also may include obtaining an image of an environment surrounding an agricultural tractor. The method also may include determining an environmental condition surrounding the agricultural tractor based on the image. The method also may include selecting one of multiple powertrain modes of the agricultural tractor based on the environmental condition. The method also may include directing a powertrain of the agricultural tractor to change to the selected one of the multiple powertrain modes.

Example 2 may include the implementations of example 1 and may include: obtaining a second image of a second environment surrounding the agricultural tractor; determining a second environmental condition surrounding the agricultural tractor is unable to be determined based on the second image; obtain environmental data regarding the environment surrounding the agricultural tractor; and in response to being unable to determine the second environmental condition based on the second image, selecting one of the multiple powertrain modes of the agricultural tractor based on the environmental data.

Example 3 may include the implementations of example 2 where the environmental data is historical environmental data.

Example 4 may include the implementations of example 1, 2, and/or 3 and may include obtaining operational data regarding operation of the agricultural tractor, wherein the selecting the one of the multiple powertrain modes is based on the environmental condition and the operational data.

Example 5 may include the implementations of example 4 where the operational data may include one or more of: data from sensors regarding the operation of the agricultural tractor, data regarding implements attached to the agricultural tractor, and a selected operational parameter for the agricultural tractor.

Example 6 may include the implementations of example 4 and/or 5 where the operational data may include a selection to prioritize one or more of: fuel consumption, operational speed, soil disruption, and soil compaction.

Example 7 may include the implementations of example 1, 2, 3, 4, 5, and/or 6 where the multiple powertrain modes may each include a configuration of one or more of: a number of one or more wheels driven by the powertrain, an air pressure of the one or more wheels, a wheel-base length for each axle of the powertrain, weight distribution for each of the one or more wheels, and a stiffness of one or more suspensions of the agricultural tractor.

Example 8 may include the implementations of example 1, 2, 3, 4, 5, 6, and/or 7 where the environmental condition is in a potential path of the agricultural tractor and the one of the multiple powertrain modes is selected before the agricultural tractor reaches the environmental condition, wherein the directing the powertrain of the agricultural tractor to change to the selected one of the multiple powertrain modes occurs before the agricultural tractor reaches the environmental condition.

Note that the implementations refer to an agriculture tractor but may refer to any vehicle.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, the scope of the invention is intended to be defined only by the claims which follow.

What is claimed is:

1. An agricultural tractor comprising:
a powertrain configured to drive one or more wheels of the agricultural tractor, the powertrain configured to operate in a plurality of powertrain modes;
an image sensor configured to capture an image of an environment surrounding the agricultural tractor; and
a processing system configured to perform operations including:
determine an environmental condition surrounding the agricultural tractor based on the image;
obtain operational data regarding operation of the agricultural tractor, the operational data including a selection to prioritize one or more of: fuel consumption, operational speed, soil disruption, and soil compaction; and
select one of the plurality of powertrain modes based on the environmental condition and the selection from the operational data, wherein a threshold for a value of the environmental condition used to select a first powertrain mode of the plurality of powertrain modes is adjusted based on the obtained operational data such that for a first environmental condition with a value, the first powertrain mode is selected in response to first operational data and a second powertrain mode is selected in response to second operational data.

2. The agricultural tractor of claim 1, wherein the environmental condition is in a potential path of the agricultural tractor and the one of the plurality of powertrain modes is selected before the agricultural tractor reaches the environmental condition, wherein the operations further comprise direct the powertrain to change to the selected one of the plurality of powertrain modes before the agricultural tractor reaches the environmental condition.

3. The agricultural tractor of claim 1, wherein the operations further include obtain environmental data regarding the environment surrounding the agricultural tractor, wherein the environmental condition surrounding the agricultural tractor is determined based on the image and the environmental data.

4. The agricultural tractor of claim 3, further comprising an environmental sensor configured to generate the environmental data obtained by the processing system.

5. The agricultural tractor of claim 3, wherein the environmental data is historical environmental data.

6. The agricultural tractor of claim 1, wherein the operational data includes one or more of: data from sensors regarding the operation of the agricultural tractor, data regarding implements attached to the agricultural tractor, and a selected operational parameter for the agricultural tractor.

7. The agricultural tractor of claim 1, wherein the plurality of powertrain modes each include a configuration of one or more of: a number of the one or more wheels driven by the powertrain, an air pressure of the one or more wheels, a wheel-base length for one or more axles of the powertrain, weight distribution for each of the one or more wheels, and a stiffness of one or more suspensions of the agricultural tractor.

8. The agricultural tractor of claim 1, wherein the operational data further includes data regarding implements attached to the agricultural tractor and the one of the plurality of powertrain modes selected is based on the environmental condition, the selection to prioritize one or more of: the operational speed, the soil disruption, and the soil compaction, and the data regarding implements attached to the agricultural tractor.

9. An agricultural tractor comprising:
a powertrain configured to drive one or more wheels of the agricultural tractor, the powertrain configured to operate in a plurality of powertrain modes and each of the plurality of powertrain modes includes a configuration of one or more of: an air pressure of the one or more wheels, a wheel-base length for one or more axles of the powertrain, and weight distribution for each of the one or more wheels; and
a processing system configured to perform operations including:
determine an environmental condition surrounding the agricultural tractor;
select one of the plurality of powertrain modes based on the environmental condition;
direct the powertrain to change to the selected one of the plurality of powertrain modes;
after directing the powertrain to change, obtain an input from a user to direct the powertrain to change to a different one of the plurality of powertrain modes; and
in response to obtaining the input from the user, adjust criteria for selection of the different one of the plurality of powertrain modes such that in the future the different one of the plurality of powertrain modes is selected based on the environmental condition.

10. The agricultural tractor of claim 9, wherein the operations further comprise obtain one or more of:
an image of an environment surrounding the agricultural tractor,
environmental data of the environment surrounding the agricultural tractor, and
operational data regarding operation of the agricultural tractor,
wherein the environmental condition surrounding the agricultural tractor is determined based on the obtained one or more of the image, the environmental data, and the operational data.

11. The agricultural tractor of claim 10, wherein the operational data is obtained and the operational data includes a selection to prioritize one or more of: fuel consumption, operational speed, soil disruption, and soil compaction.

12. The agricultural tractor of claim 9, wherein each of the plurality of powertrain modes includes the configuration of two or more of: the air pressure of the one or more wheels, the wheel-base length for the one or more axles of the powertrain, and the weight distribution for each of the one or more wheels.

13. The agricultural tractor of claim 9, wherein each of the plurality of powertrain modes includes the configuration of: the air pressure of the one or more wheels, the wheel-base length for the one or more axles of the powertrain, and the weight distribution for each of the one or more wheels.

14. The agricultural tractor of claim 9, wherein the processing system is configured to select one of the plurality of powertrain modes based on the environmental condition and a selection to prioritize one or more of: operational speed, soil disruption, and soil compaction.

15. A method to control a tractor, the method comprising:
obtaining an image of an environment surrounding an agricultural tractor;
determining an environmental condition surrounding the agricultural tractor based on the image;
selecting one of a plurality of powertrain modes of the agricultural tractor based on the environmental condition;
directing a powertrain of the agricultural tractor to change to the selected one of the plurality of powertrain modes;
obtaining historical data that includes one or more powertrain modes selected on a plurality of previous days and condition information for each of the plurality of previous days, the condition information for a day of the plurality of previous days including one or more of: a weather season that includes the day, a weather pattern corresponding to the day, and an irrigation pattern corresponding to the day;
after directing the powertrain of the agricultural tractor to change, obtaining a second image of a second environment surrounding the agricultural tractor;
determining a second environmental condition surrounding the agricultural tractor is unable to be determined based on the second image;
analyzing the historical data to identify a previous day of the plurality of previous days that includes condition information that corresponds to current conditions of the second environment; and
in response to being unable to determine the second environmental condition based on the second image, directing the powertrain of the agricultural tractor to change to a powertrain mode of the plurality of powertrain modes used on the identified previous day.

16. The method of claim 15, further comprising obtaining operational data regarding operation of the agricultural tractor, wherein the selecting the one of the plurality of powertrain modes is based on the environmental condition and the operational data.

17. The method of claim 16, wherein the operational data includes one or more of: data from sensors regarding the operation of the agricultural tractor, data regarding implements attached to the agricultural tractor, and a selected operational parameter for the agricultural tractor.

18. The method of claim 16, wherein the operational data includes a selection to prioritize one or more of: fuel consumption, operational speed, soil disruption, and soil compaction.

19. The method of claim 15, wherein the plurality of powertrain modes each include a configuration of one or more of: a number of one or more wheels driven by the powertrain, an air pressure of the one or more wheels, a wheel-base length for one or more axles of the powertrain, weight distribution for each of the one or more wheels, and a stiffness of one or more suspensions of the agricultural tractor.

20. The method of claim 15, wherein the environmental condition is in a potential path of the agricultural tractor and the one of the plurality of powertrain modes is selected before the agricultural tractor reaches the environmental condition, wherein the directing the powertrain of the agricultural tractor to change to the selected one of the plurality of powertrain modes occurs before the agricultural tractor reaches the environmental condition.

* * * * *